Oct. 21, 1924.
P. B. BLOCKER
TIRE CHAIN
Filed Aug. 28, 1922    2 Sheets-Sheet 1
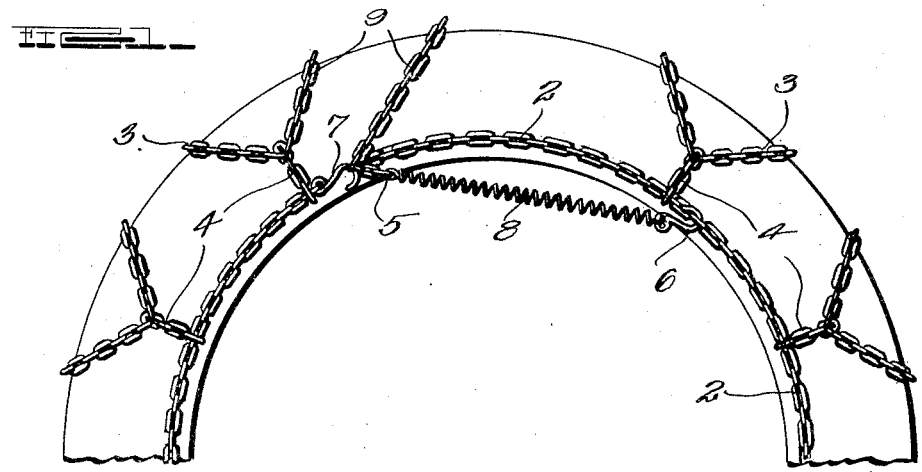
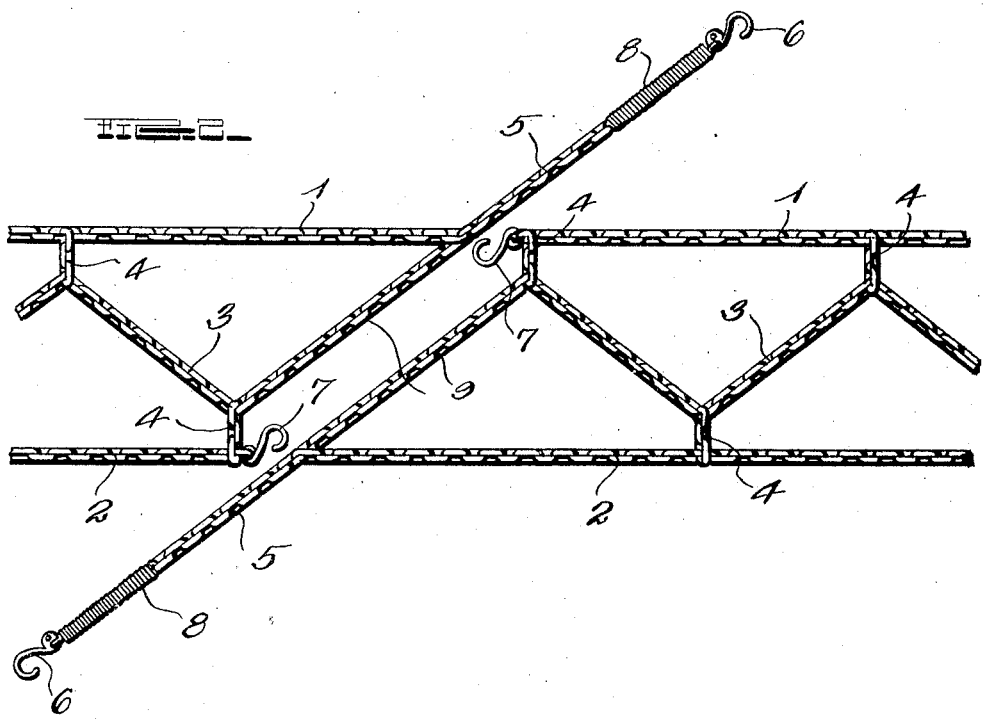
Inventor
Preston B. Blocker
Witness
Attorneys

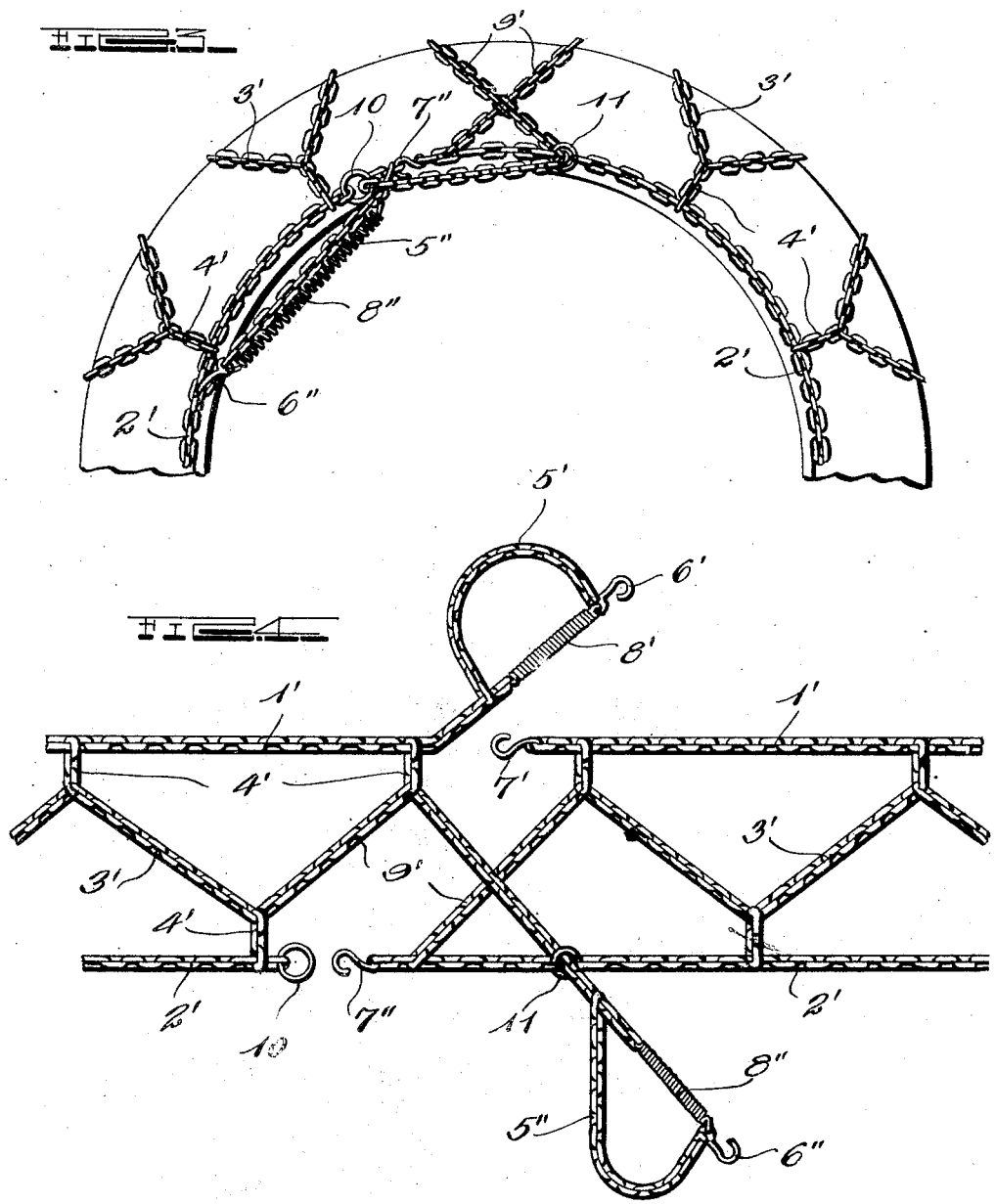

Patented Oct. 21, 1924.

1,512,269

UNITED STATES PATENT OFFICE.

PRESTON BROOKS BLOCKER, OF SILVER CITY, NEW MEXICO.

TIRE CHAIN.

Application filed August 28, 1922. Serial No. 584,899.

*To all whom it may concern:*

Be it known that I, PRESTON B. BLOCKER, a citizen of the United States, residing at Silver City, in the county of Grant and State of New Mexico, have invented certain new and useful Improvements in Tire Chains; and I do declare the following to be a full, clear, and exact description of the invention, such as will enable others skilled in the art to which it appertains to make and use the same.

This invention relates to tire chains or anti-skid chains for vehicle wheels, and the particular improvements therein reside in a means for coupling the ends of the chains together.

The invention has been designed in order to provide a tire chain which when in use will have a continuous contact tread chain member and which will be maintained yieldably stretched to such an extent that the means for coupling its ends together will be prevented from being accidentally uncoupled.

The novelty in the invention resides in the various details of construction and the combination and arrangement of parts which are hereinafter fully described and claimed, and shown in the accompanying drawings.

In the accompanying drawings which form a part of this specification:—

Fig. 1 is a side elevation of a portion of an automobile tire, illustrating a chain constructed in accordance with the invention applied thereon;

Fig. 2 is a plan view of a portion of the chain illustrated in Fig. 1;

Fig. 3 is a side elevation of a portion of an automobile tire illustrating another chain constructed in accordance with the invention applied thereon; and Fig. 4 is a plan view of a portion of the chain illustrated in Fig. 3.

In the embodiment of the invention illustrated in Figs. 1 and 2, the numerals 1 and 2 represent parallel side chain members having disposed between them and connected thereto cross linkage, which includes a zig-zag tread chain 3 and transverse links 4 connecting the tread chain 3 to the side chain members 1 and 2.

The side chain members 1 and 2 are arranged out of transverse registry as clearly shown in Fig. 2 of the drawings so that one of the end portions of each member forms a tie end 5. The extremities of the tie ends 5 are provided with hooks 6, and the other extremities of the side chain members 1 and 2 are provided with similar hooks 7.

The tie ends 5 have coil springs 8 disposed within their lengths.

This type of chain should be placed around the tire or vehicle wheel in the usual manner, and in order to couple its end portions together, the hooks 7 should first be engaged with one of the links in the tie ends 5. The tie ends 5 should then be carried backwardly away from the hooks 7 and the hooks 6 should be engaged with one of the links in the side chain members 1 and 2 so that the coil springs 8 will be placed under tension. The coil springs 8 when under tension will maintain the side chain members 1 and 2 stretched and will also prevent the hooks 6 and 7 from becoming accidentally disengaged.

As will be seen from Figs. 1 and 2 of the drawings, when the tire chain is disposed upon a tire, the end portions 9 of the zig-zag tread chain 3 will be disposed in parallel relation and will lie close together.

By this construction and arrangement of parts there always will be portions of the zig-zag tread chain in engagement with the ground along the entire tread or circumference of the tire as the tire rolls upon the ground. This insures effective traction and prevents skidding, and also eliminates the necessity of coupling the ends of the tread chain together.

In the embodiment of the invention illustrated in Figs. 3 and 4, the numerals 1' and 2' represent side chain members having disposed between them and connected thereto cross linkage comprising a zig-zag tread chain 3' and transverse links 4' coupling the tread chain 3' to the side chain members 1' and 2'.

The side chain members 1' and 2' are arranged out of transverse registry, and the side member 1' is slightly longer than the side member 2', as shown in Fig. 4, so as to form a tie end 5'. The extremity of the tie end 5' is provided with a hook 6' and disposed within the length of the tie end 5' is a coil spring 8'. The other extremity of the side chain member 1' is provided with a hook 7'.

The side member 2' is provided at its extremity corresponding to the extremity of the side member 1' which carries the hook 6', with an eye 10, and at its other extremity with a hook 7″. The end portion of the side member 2′ which carries the hook 7″ is provided with an eye 11, the eye 11 being disposed adjacent but slightly spaced from the hook 7″.

The tread chain 3′ terminates at its end adjacent the hook 6′ and the eye 10 in a tie end 5″. This tie end 5″ has disposed within its length a coil spring 8″ and has a hook 6″ secured to its extremity.

The type of chain illustrated in Figs. 3 and 4 of the drawings is applied to an automobile tire or vehicle wheel in the usual manner and its end portions are coupled together by first engaging the hook 7′ with one of the links in the tie end 5′ and carrying the tie end 5′ back so as to stretch the spring 8′ and engage the hook 6′ with one of the links in the side chain member 1′. After this has been done, the tie end 5″ should be passed through the eye 11 and then the eye 10, after which the hook 7″ should engage one of its links and it should then be carried back so as to stretch the spring 8″ and have its hook 6″ engage one of the links in the side chain member 2′.

When this type of chain is applied to an automobile tire or vehicle wheel in the manner just described, the spring 8′ will maintain the side chain member 1′ stretched and will prevent the hooks 6′ and 7′ from becoming accidentally disengaged. The spring 8″ will maintain practically the entire chain stretched, especially the tread chain 3′ and the side chain member 2′ and at the same time, it will prevent the hooks 6″ and 7″ from being accidentally disengaged. The extremities 9′ of the tread chain 3′ will be disposed in parallel relation, and one of these extremities 9′ will be crossed by the tie end 5″ so that there always will be portions of the zig-zag tread chain in contact with the ground as the tire rolls upon the ground.

The tie ends 5, 5′ and 5″ of the chains are of sufficient length to permit them to be passed between the spokes of a wheel and then fastened, so that the chains may be applied to a wheel standing in deep mud, sand or snow without jacking or otherwise lifting it.

If desired, the hooks 6, 7, 6′, 6″, 7′ and 7″ may be substituted by other suitable fastening elements.

From the foregoing description taken in connection with the drawings, it will be seen that either of the two types of chains disclosed may be coupled together at their ends so that they will be yieldably maintained stretched and so that they will not become accidentally uncoupled. It will also be seen that either of the types of chains disclosed may be fitted upon different sizes of tires and vehicle wheels, but it is to be pointed out that the type of chain illustrated in Figs. 1 and 2 of the drawings is intended to be used upon the tires and wheels of light automobiles and vehicles, while the type of chain illustrated in Figs. 3 and 4 is intended to be used upon the tires and wheels of heavy automobiles, trucks and vehicles.

It is obvious that various changes in form, proportion, and in the minor details of construction may be made without departing from the principle or sacrificing any of the advantages of the invention, and hence it is to be understood that such changes may be made within the meaning and scope of the appended claims which define the particular improvements herein disclosed.

What is claimed is:

1. A tire chain comprising parallel side chain members, cross linkage between and connected to said members, a hook secured to one extremity of one member, an eye secured to said member at a point adjacent said hook, an eye secured to the other extremity of said member, a tie end extending from the end of the chain which carries the last mentioned eye, a hook secured to the extremity of said tie end, said tie end being adapted to be passed through the first and then the last mentioned eyes and to be engaged by the first mentioned hook and then to be detachably coupled by means of the last mentioned hook to the end portion of said member which carries the last mentioned eye, a coil spring disposed within the length of said tie end to maintain the tire chain stretched and to prevent said hooks from becoming disengaged, and means for detachably coupling the end portions of the other member together.

2. A tire chain comprising parallel side members, cross linkage between and connected to said members, a hook secured to one extremity of one member, an eye secured to said member at a point adjacent said hook, an eye secured to the other extremity of said member, said cross linkage including a zig-zag tread chain terminating at its end adjacent the last mentioned eye in a tie end, a hook secured to the extremity of said tie end, said tie end being adapted to cross the other extremity of said tread chain and to be passed through the first and then the last mentioned eyes and to be engaged by the first mentioned hook and then to be detachably coupled by means of the last mentioned hook to the end portion of said member which carries the last mentioned eye, a coil spring disposed within the length of said tie end to maintain the tire chain stretched and to prevent said hooks from becoming disengaged, and means for detachably coupling the end portions of the other member together.

3. The combination with a tire, of an anti-skid chain disposed circumferentially around said tire, said anti-skid chain comprising a pair of parallel side chain members disposed on opposite sides of said tire and having their extremities detachably coupled together, cross linkage between and connected to said side chain members, said cross linkage including a zig-zag tread chain, one extremity of said zig-zag tread chain being secured to one of said side chain members and the other extremity of said zig-zag tread chain being secured to the other side chain member, said extremities of said zig-zag tread chain being disposed close together and in parallel relation, so that portions of said zig-zag tread chain will continuously engage the ground along the entire tread of the tire when the tire rolls upon the ground.

In testimony whereof I have hereunto affixed my signature.

PRESTON BROOKS BLOCKER.